(12) United States Patent
Marsden

(10) Patent No.: US 10,389,748 B2
(45) Date of Patent: Aug. 20, 2019

(54) SECURE LOADING SECURITY INFORMATION FOR ENCRYPTING COMMUNICATIONS BETWEEN A DEVICE AND AN END POINT SERVER

(71) Applicant: Eseye Limited, Guildford, Surrey (GB)

(72) Inventor: Ian Marsden, Lyne (GB)

(73) Assignee: Eseye Limited, Guildford, Surrey (GB)

( * ) Notice: Subject to any disclaimer, the term of this patent is extended or adjusted under 35 U.S.C. 154(b) by 95 days.

(21) Appl. No.: 15/267,536

(22) Filed: Sep. 16, 2016

(65) Prior Publication Data

US 2018/0041541 A1 Feb. 8, 2018

(30) Foreign Application Priority Data

Aug. 5, 2016 (GB) .................................... 1613517

(51) Int. Cl.
*H04W 12/08* (2009.01)
*H04W 4/14* (2009.01)
*H04L 29/06* (2006.01)
*H04M 3/42* (2006.01)
*H04W 12/04* (2009.01)
*H04W 8/20* (2009.01)
*H04L 29/12* (2006.01)
*H04W 8/04* (2009.01)
*H04W 8/26* (2009.01)

(52) U.S. Cl.
CPC ...... *H04L 63/1441* (2013.01); *H04L 63/0428* (2013.01); *H04L 63/062* (2013.01); *H04L 63/0823* (2013.01); *H04M 3/42178* (2013.01); *H04W 4/14* (2013.01); *H04W 12/04* (2013.01); *H04L 61/6054* (2013.01); *H04L 63/0853* (2013.01); *H04M 3/42382* (2013.01); *H04M 2203/6009* (2013.01); *H04M 2203/6081* (2013.01); *H04M 2207/18* (2013.01); *H04W 8/04* (2013.01); *H04W 8/265* (2013.01); *Y04S 40/24* (2013.01)

(58) Field of Classification Search
CPC ............ H04L 61/6054; H04L 63/0428; H04L 63/0823; H04L 63/0853; H04L 61/1441; H04M 3/42178; H04W 4/14; H04W 8/04
See application file for complete search history.

(56) References Cited

U.S. PATENT DOCUMENTS 7,929,959 B2 * 4/2011 De Atley ............... H04W 8/265
379/161
8,594,628 B1 * 11/2013 Schroeder ............. H04W 12/06
370/331

(Continued)

FOREIGN PATENT DOCUMENTS

EP 0944203 A2 9/1999
WO WO-0048416 A1 * 8/2000 ............ H04W 88/02

OTHER PUBLICATIONS

Schroeder, Hartmut. "Solutions for Implementing Cellular to Wi-Fi Offload." (2012). (Year: 2012).*

*Primary Examiner* — Michael Simitoski
(74) *Attorney, Agent, or Firm* — Kilpatrick Townsend & Stockton LLP

(57) ABSTRACT

A method of distributing security information to a device quarantines the device and then, in the quarantine state, downloads security information using a method protected by the inherent security in the mobile network such as USSD or SMS.

12 Claims, 4 Drawing Sheets

(56) References Cited

U.S. PATENT DOCUMENTS

| | | | |
|---|---|---|---|
| 8,606,232 B2* | 12/2013 | Siu | H04W 8/205 455/411 |
| 8,843,179 B2* | 9/2014 | Li | H04W 8/20 455/558 |
| 2004/0198322 A1* | 10/2004 | Mercer | H04L 51/38 455/412.1 |
| 2004/0240671 A1* | 12/2004 | Hu | H04W 12/04 380/277 |
| 2005/0153683 A1* | 7/2005 | Gustafsson | H04L 29/06 455/411 |
| 2006/0035631 A1* | 2/2006 | White | H04M 3/382 455/418 |
| 2006/0183500 A1* | 8/2006 | Choi | H04W 8/265 455/558 |
| 2007/0208859 A1* | 9/2007 | Vataja | H04L 65/1069 709/227 |
| 2009/0061839 A1* | 3/2009 | Zimmerman | H04W 8/265 455/419 |
| 2009/0068999 A1* | 3/2009 | Chen | H04W 8/265 455/414.2 |
| 2009/0149175 A1* | 6/2009 | Lopresti | H04W 8/265 455/433 |
| 2009/0282251 A1* | 11/2009 | Cook | H04L 63/062 713/171 |
| 2010/0029247 A1* | 2/2010 | De Atley | H04W 8/265 455/411 |
| 2010/0291907 A1* | 11/2010 | MacNaughtan | G06Q 30/0241 455/414.1 |
| 2010/0330968 A1* | 12/2010 | Pecen | H04M 1/675 455/414.1 |
| 2012/0058743 A1* | 3/2012 | Chen | H04L 63/102 455/411 |
| 2012/0071152 A1* | 3/2012 | Roundtree | H04W 4/14 455/419 |
| 2012/0157050 A1* | 6/2012 | Kang | H04W 12/06 455/411 |
| 2012/0196569 A1* | 8/2012 | Holtmanns | H04L 63/0428 455/411 |
| 2012/0208597 A1* | 8/2012 | Billman | H04W 8/205 455/558 |
| 2012/0264400 A1* | 10/2012 | Khan | H04L 63/0876 455/411 |
| 2012/0276872 A1* | 11/2012 | Knauth | H04L 63/18 455/411 |
| 2014/0051423 A1* | 2/2014 | Marsden | H04W 4/001 455/419 |
| 2014/0185597 A1* | 7/2014 | Gupta | H04L 63/0823 370/338 |
| 2015/0163102 A1* | 6/2015 | Staykoff | H04L 41/5054 709/203 |
| 2015/0373546 A1* | 12/2015 | Haugen | H04W 12/08 726/22 |
| 2016/0165433 A1* | 6/2016 | Larignon | H04W 8/205 455/419 |
| 2017/0083917 A1* | 3/2017 | Sjoholm | G06Q 20/4014 |
| 2018/0034789 A1* | 2/2018 | Gaydos | H04L 27/34 |

\* cited by examiner

SECURE LOADING SECURITY INFORMATION FOR ENCRYPTING COMMUNICATIONS BETWEEN A DEVICE AND AN END POINT SERVER

FIELD OF INVENTION

The invention relates to methods of loading security information, such as keys and/or certificates, onto a device after manufacture, and apparatus adapted to carry out such methods.

BACKGROUND TO THE INVENTION

Many devices are manufactured in bulk, and it is then necessary to provide unique security material in the device, in the form of security certificates, secure communications software, private keys and the like, after manufacture.

One approach is that the vendor of the product provides to the manufacturer or other third party the security information. The manufacturer or third party is then responsible for loading the material to the device. However, in this case, there is a risk that the vendor or other third party may treat the security material improperly and result in its leak or modification hence resulting in a loss of security. In addition, this approach adds significant cost and complexity to any manufacturing process.

Therefore it would be preferred for security information to be loaded onto the device after shipping the device to the customer so that the required security information can be tailored to the customer's needs, activities, and local laws without requiring the intervention of a third party. This process can however present a significant security risk, since there is no existing security material in the device to protect the transport, the downloading of security information can be compromised and this can give an unauthorised third party very damaging access.

This is a particular problem when the downloading of security information takes place over a public network, such as when a device downloads security information over public wired or wireless communications services such as mobile telephone (cellular) services which then connect to a security server through the public internet.

SUMMARY OF THE INVENTION

According to the invention, there is provided a method of distributing security information to a device containing a processor, a user memory containing at least one software application requiring the security information for communication with an end point server via an access point name, APN, a security identity module, SIM, and a cellular modem, the method comprising:

initialising a quarantine state in a mobile network in which the mobile device cannot access the end point server;
  sending an authentication message from the device via the mobile network to the home location register corresponding to the security identity module,
  triggering, by the authentication message, the registration of the device on the mobile network, and the downloading of security information to the device. wherein the downloading of security information takes place over the air using the short message service, SMS, and/or unstructured supplementary service data, USSD, messages; and
  after successful download of the security information to the device, activating an operation state for the device so that the device can access the end point server.

By combining a specific quarantine mode, delivered at network level, with protected secure communication, secure downloading of security information is possible even though the device is not provided with certificates/security material at the point of manufacture or shipping.

The method uses the relatively secure mobile standard connection, either SMS messages or the USSD channel, to download security information to an application running on the device so that the application can then communicate to an end point server using the security information for end-to-end encryption to secure communication between the end point server and the device.

The quarantine state may be implemented by responding to a request for a data connection from the device by placing the device into a local subnetwork which contains only predetermined servers and does not contain the end point server. In this way, the device simply cannot access the end point server in the quarantine mode.

A trust server may be provided on the local subnetwork of the quarantine state, and the method may include downloading data to the device from the trust server through the local subnetwork in the quarantine mode.

The operation state may be implemented by placing the device into a local subnetwork which contains the end point server.

In embodiments, the device has an international mobile station equipment identity, IMEI, and the method further comprises the step of locking the SIM to the device determined by the IMEI so that the SIM will only operate in the device having the IMEI before the step of sending an authentication message.

The step of sending an authentication message from the device may be carried out on first power up of the device.

To upload security information later, the above steps may be repeated, in particular the said steps of initialising a quarantine state in the network, sending an authentication message, triggering, by the authentication message, the registration of the device on the mobile network, downloading security information to the device, and after successful download of the security information to the device, removing the quarantine state.

The SIM may be hard coded with a fixed access point name so that the SIM can only request a packet data connection to that fixed access point name. This further enhances security, and ensures that the SIM will access the correct access point which is programmed to carry out the method. The access point may define a suitable local network for the operation state, the local network including a required end server. The identity and network address of the end server may not be known at the point of manufacture or sale but only be selected on provisioning the device on the mobile network.

The security information may comprise a security certificate, a key, or both.

In another aspect, the invention relates to a mobile network system, comprising:
  an access point connected to a network having an end server;
  a security server; and
  a home location register;
  wherein the mobile network system is arranged:
  to initialise a quarantine state in the mobile network in which a device cannot access the end point server;

to receive an authentication message from the device via the mobile network in the home location register indicated by a SIM in the device, to trigger, by the authentication message, the registration of the device on the mobile network, and to download of security information to the device. over the air using the short message service, SMS, and/or unstructured supplementary service data, USSD, messages; and after successful download of the security information to the device, to activate an operation state for the device so that the device can access the end point server.

BRIEF DESCRIPTION OF THE DRAWINGS

An example of the invention will now be described with reference to the accompanying diagrams, in which.

Figure 1:
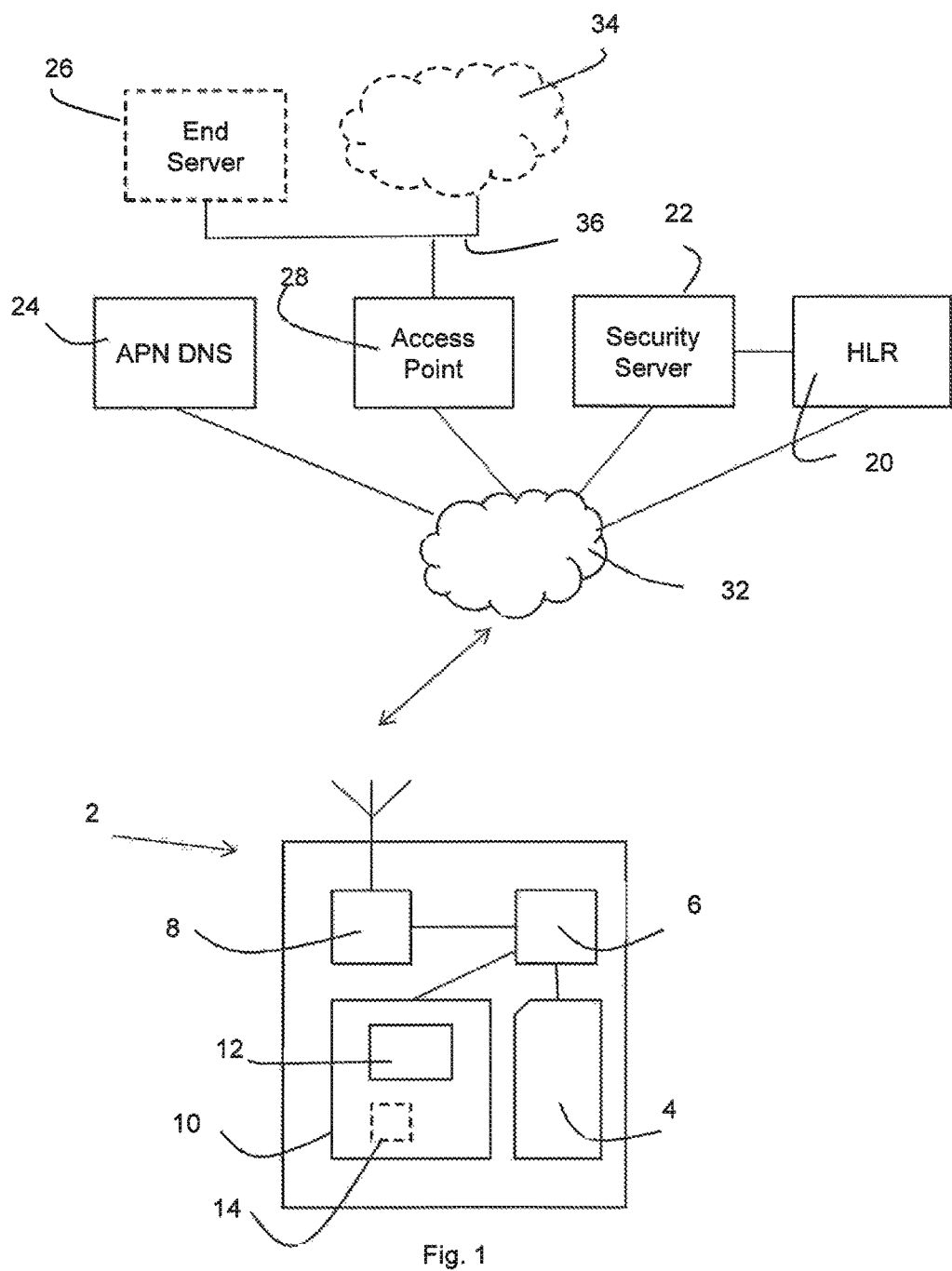
FIG. 1 illustrates a device and various components in a mobile network in a quarantine state

The figures are schematic and not to scale.

DETAILED DESCRIPTION

According to an example of the invention, there is provided a device 2 which is intended to communicate using a mobile network with an end server 26 and to provide data to that end server. It will be appreciated that there are many applications, for example data logging and smart meters, where devices require secure communication to a server, and although such devices use the mobile, cellular network there is no need for the devices themselves to be mobile—they can and frequently are fixed in place as is for example the case with a smart meter.

In order to protect the data transfer between the device 2 and the end server 2, it is necessary for the device to have appropriate security information 14 which may for example include a certificate, a public key and a private key to carry out communications. The device 2 is manufactured and shipped without these, so that it is not necessary to decide all details at the point of manufacture. For example, a smart meter may be manufactured for a number of utilities and it is only at point of use that it will be known which utility is installing the smart meter and hence the address of the end server and the required security.

Note that the security information is not downloaded over a conventional secure data link for downloading, namely secure socket layer/transport security layer (SSL/TLS), since on first power up there are no certificates or keys on the device 2 and therefore the device is not at this stage set up to use SSL/TLS. It is clearly undesirable to download secure data without using SSL/TLS, in view of the risk of the data being intercepted.

The device 2 includes a processor 6, a SIM card 4, a wireless modem 8, and a memory 10 which includes software 12 which may be described as firmware. The SIM card 4 used in this example is locked to a particular access point, and can only make a data connection to that access point 28, referenced with a particular access point name APN.

The mobile network has a number of components, including a home location register, HLR 20, an access point which in this example of a GSM mobile network is gateway GPRS support node (GGSN) 28. Other conventional components of the mobile network are indicated schematically as 32 which is intended to represent a mobile base station and associated components to allow for SMS communication, USSD signaling, routing and also to permit packet data connection such as by including a serving GPRS support node (SGSN). Since these are conventional they are not described in more detail. When a packet data connection is formed, the signal is received in the base station, the SGSN is responsible for communication with the device 2 through the base station, and the GGSN is responsible for communication onwards, for example to the public internet or local servers, through network 36.

Note that these components may include components for international routing—i.e. it is not necessary that the device 2 is in the same territory as the access point or the home location register. Any domain name server (DNS) will resolve the access point name into the location of the access point 28.

A security server 22 is provided to hold security information centrally to download it to the device as will be described below.

The mobile device is shipped configured on the network in "quarantine" mode which means that the device has no data path enabled except to a specific server or servers and will not be allowed to connect generally until the security information has been downloaded. The quarantine mode is provided at the network level for security, i.e the functionality is not simply implemented in the device to avoid the risk that the SIM will be removed and placed in a different device.

When the device in the quarantine mode attempts to make a packet data connection, this involves making a request to connect to the access point represented by the APN hard coded into the SIM. The APN is resolved in a domain name server 24. Since the SIM is able to only access a particular access point name, it is not possible for the SIM to connect to any alternative access point which increases security.

The quarantine state is implemented by the response of the GGSN to the request to access a network identified by the access point name. The GGSN contains code to determine whether the access point name relates to a network which may be in a quarantine mode, and if such an access point name is requested the code identifies whether the device is in a quarantine state or not, and connects to a different local subnetwork depending on the state. The test as to the state of the device may be simply seeing if the device is on a list of devices that have security information downloaded and which may therefore be put into an operation state, and if the device is not in on the list the device is put into the quarantine state.

On first connection, the device 2 is in a quarantine state, and no external access is required. The GGSN places the device into a local sub-network 36 with no external access at all, but only having on the subnetwork a small number of pre-determined servers, or even none at all, i.e. no local data network is provided. In this way, it is not possible for the device to connect to any other server such as end server 26, since this is not present on the subnetwork.

The local subnetwork may, for example, use private Ipv4 addresses for example in the range 10.0.0.0 to 10.255.255.255 since no external data access is required. Other network addresses may be used if required. Although the GGSN is in principle capable of connecting to the end server 26 or the public internet 34, and will in fact have network connections to these, these are not present on the local sub-network and hence are shown dotted—they are simply not available on the sub-network.

Thus, in a quarantine state, as illustrated in FIG. 1, the device 2 is placed in a sub-network where no access is possible to either end server 26 nor to the general internet 34.

This differs from a conventional network state in which a public address, typically a dynamic address, but potentially also a fixed address, is provided to the device so that the device can connect to the public internet and be accessed from servers on the public internet using the address.

Figure 2:
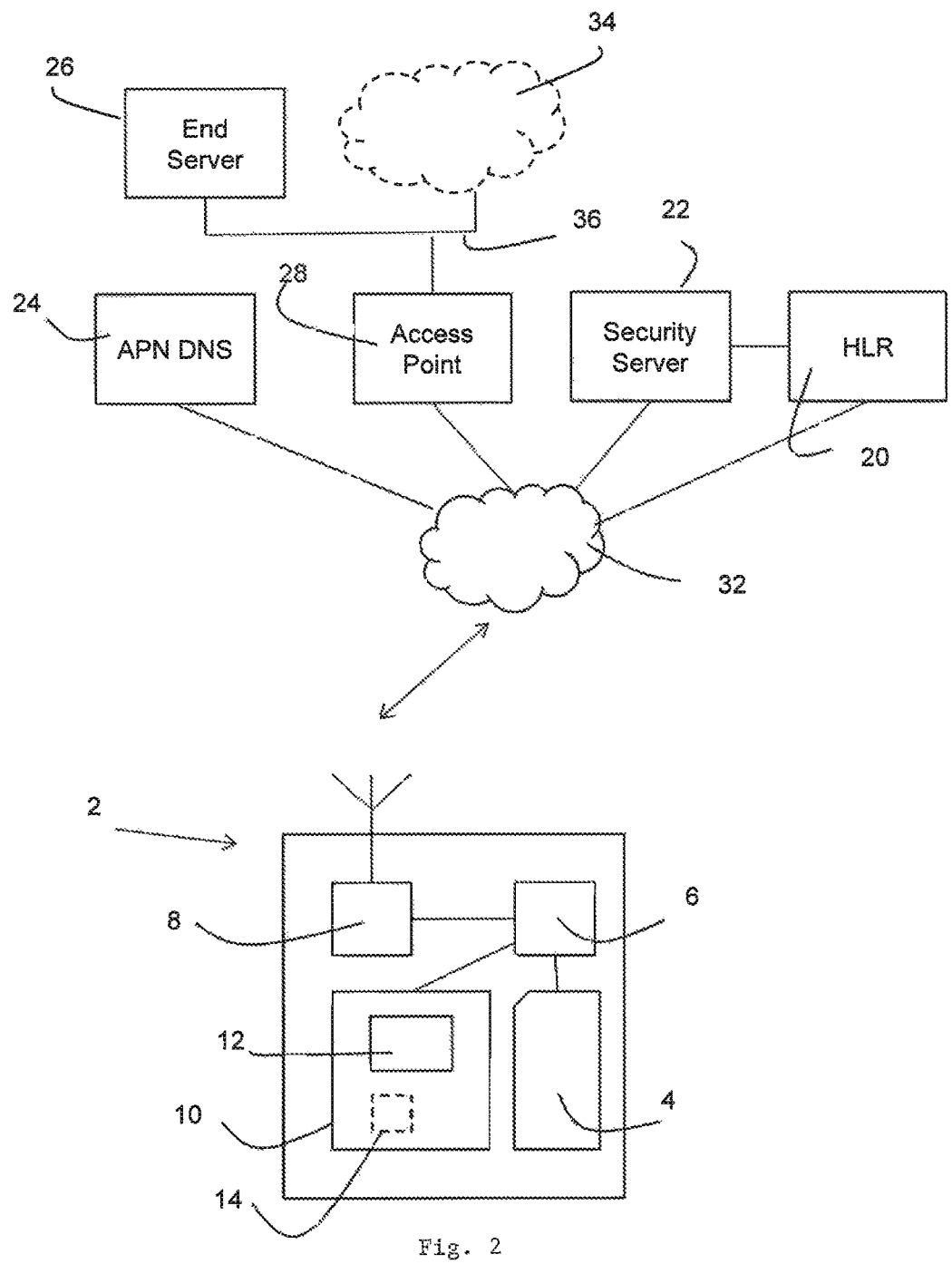
FIG. 2 illustrates the device and various components in the mobile network in a normal state.

In the implementation of this example, however, for greater security even outside the quarantine mode in an operation state the device is put into a sub-net which only connects to pre-determined servers, as illustrated in FIG. 2. In the case of the device in the operation state, this includes the end server 26, but not the security server 22. Thus, this implementation ensures that the device can connect to the end server in this mode, but not to the security server. Since no access is possible to the security server, security information cannot be downloaded in this state, only in the more protected quarantine state.

Thus the provision of the two states is achieved by providing two different sub-networks for a single access point name, one being an operation state and one a quarantine state.

In alternative examples, there will be a need for the device to access the public internet 34 and in this case the device in the operation state can be put into a sub-network with such public internet access.

Figure 3:
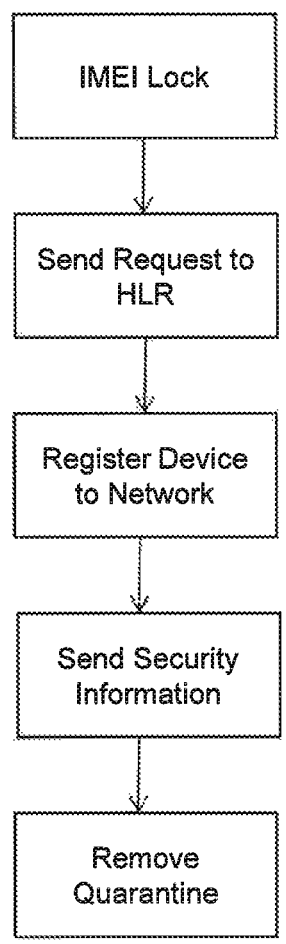
FIG. 3 is a flow diagram of a method according to the invention.

The operation of the device will now be described with reference to FIGS. 1 to 3. On first power up, activation software 12, which may be part of the firmware of the device, is run which may lock the SIM card 4 to the device 2, i.e the SIM card will be locked to the IMEI of the device and will only operate with the specific device. In a preferred embodiment, this is a requirement for the subsequent steps, i.e. until the device 2 is protected the security information will not be downloaded. This avoids the possibility of downloading security information to a non-protected device.

Then, the device connects to the mobile network and routes a request to the home location register, HLR 20, of the mobile network of the SIM card. In response, the HLR provisions the SIM card on the mobile network, i.e. activates the SIM card on the mobile network.

In this state, the security server 22 connected to the HLR is triggered by the request to generate security information 14 in the form of a certificate and keys. These are pushed to the device.

In an alternative example, the security information is downloaded after a further request from the device.

In order to protect the security information from unauthorised third parties, two approaches are foreseen. In one approach, the security information is downloaded using GSM over the air, OTA, processes using SMS messages. The necessary certificates and keys are divided by the mobile network and sent to the device 2 as SMS messages where they are reconfigured by the software on the device and stored as security information.

Alternatively, the device 2 can download the security information from the security server using the GSM USSD signalling channel.

In either case, the security information is protected by the mobile telephony standard, in this case the GSM standard. The data is not sent by a conventional packet switched connection through access point 28, instead through a USSD messaging gateway or via SMS using the components indicated schematically at 32.

The security information can include the necessary security information for SSL/TLS, i.e. a certificate and public and private keys.

The security information may also include the end point address, i.e. details of the end point, i.e. the address of the server 26 that the device 2 is to send data to. Information regarding which end point server 26 or servers are to be used also needs to be transmitted securely to ensure that the data is sent to the correct server and not to a server of an unauthorised third party.

Only once the security information has been successfully loaded does the network connection change from the quarantine state to the operation state. To achieve this, the device 2 may send a message back through the USSD channel or as an SMS to the security server 22 confirming that the security information has been downloaded, and this message may cause the security server to send a message to update the network to take the SIM out of quarantine mode. In this mode, the GGSN places the device 2 in a sub-network which allows access to end server 26, but not to security server 22 nor in this example to the public internet 34.

In an alternative example, it may be necessary to allow the device access to the public internet 34, and this may be achieved by placing the device on a sub-network allowing access to the public internet 34. Note that the exact access of a device may be defined while provisioning the device on the network.

Figure 4:
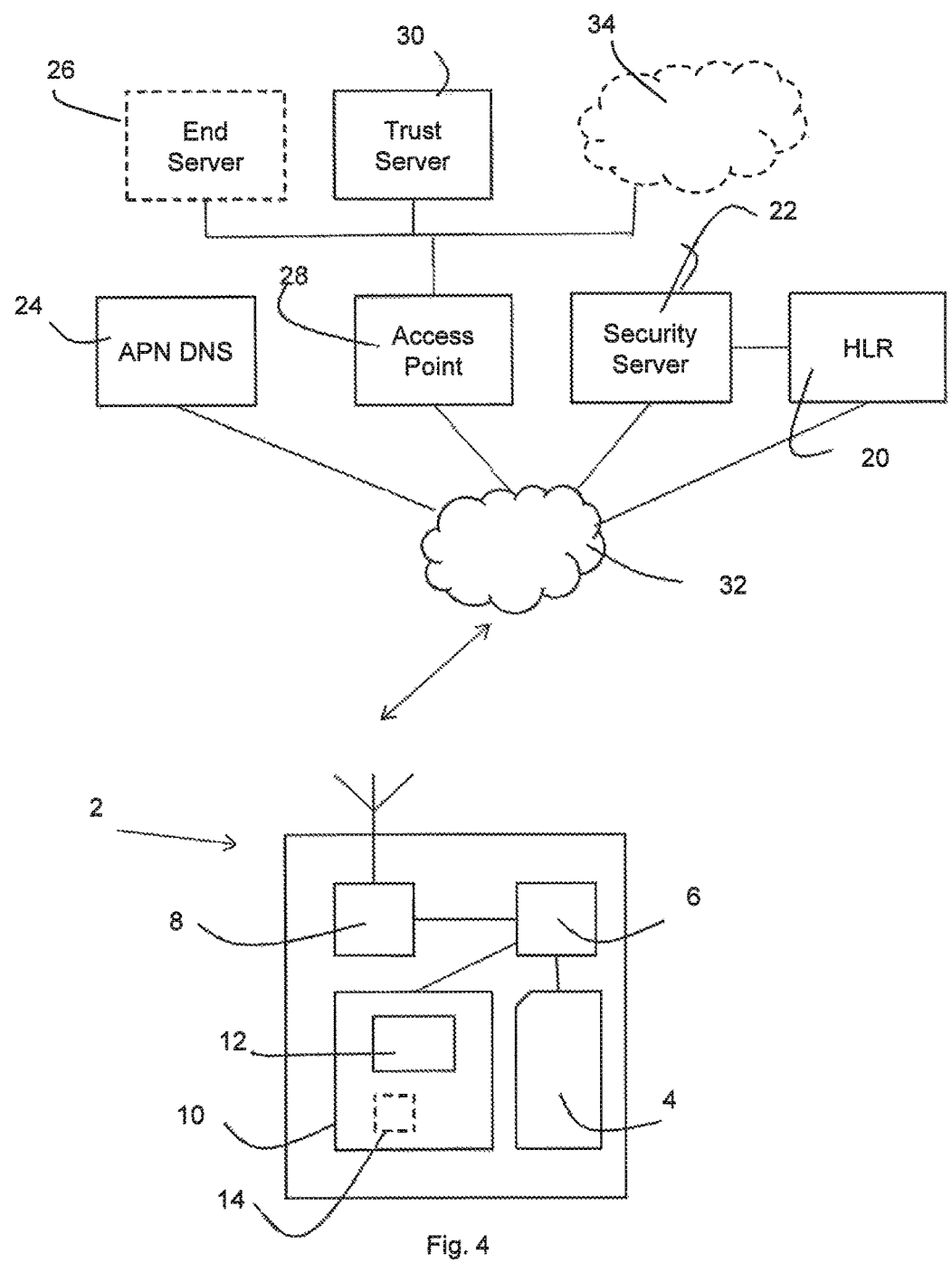
FIG. 4 illustrates the device and various components in the mobile network in a different implementation.

In an alternative example, illustrated in FIG. 4, the device in the quarantine mode is connected to a local network having an additional trust server 30.

In this example the trust server is indicated as a separate server to the security server, though alternately the two can be combined. This is particularly useful if some data to be downloaded in the quarantine mode does not need to be fully secured, for example graphics data or public keys. The trust server 30 delivers data through the conventional packet switched network, not USSD or SMS. This reduces the amount of data that needs to be downloaded through the USSD or SMS channels. When the quarantine mode is lifted, and the device placed in the normal mode, the device cannot connect to the trust server nor to the security server but can connect to the end server 26 and if necessary to the public internet 34.

In a yet further alternative example, the device 2 in the quarantine mode downloads the security information by USSD or SMS, and then creates a secure end-to-end data connection to the trust server 30 using the security information, and downloads further information from the trust server 30.

In the examples above, the security information is downloaded on first switching on and provisioning the mobile device. However, the method may also be triggered later. In particular the device, the network, or a user may detect a security threat and move the device back into the quarantine mode, and may then carry out the steps described above to load updated security information.

Alternatively, the security information may be time-limited, and the device may go back into quarantine mode after the time-limited security information has expired. The device may then download new security information as discussed above.

In an alternative example, the downloading of the security information may be triggered not on first power up but by user action.

Additional security can be provided at the device level, for example in the software 12.

Those skilled in the art will understand that the above examples are presented by way of example only and that features described with respect to one example may be combined with those of other examples. Further, although the above description relates to a mobile device operating using GSM, the same principles will apply to other mobile standards such as 4G, 5G, EDGE, or indeed any other mobile standard allowing data connections. For this reason, the gateway that is referred to as a GGSN 28 in the GSM standard may also be a corresponding access point or gateway according to other standards as required.

The invention claimed is:

1. A method of distributing security information used to encrypt and decrypt end-to-end communication with an end point server, the method comprising:
   providing a mobile network comprising an access point connected to a network having the end point server, a security server and a home location register, the security server storing the security information used to encrypt and decrypt the end-to-end communications with the end point server;
   providing a mobile device comprising a processor, a user memory containing a software application programmed to use the security information to encrypt and decrypt the end-to-end communications with the end point server, a security identity module (SIM) and a cellular modem, adapted to communicate with the mobile network;
   operating the access point of the mobile network to initially place the mobile device in a quarantine state in which the mobile device cannot access the end point server;
   sending an authentication message from the mobile device to the home location register corresponding to the security identity module,
   using the home location register to trigger, by the authentication message, a registration by the home location register of the mobile device on the mobile network and a downloading of the security information from the security server to the mobile device, wherein the downloading of the security information takes place over the air using a short message service (SMS) and/or unstructured supplementary service data (USSD) messages; and
   after a successful download of the security information to the mobile device, using the access point to activate an operation state for the mobile device, to thereby exit the quarantine state, so that the mobile device can access the end point server.

2. A method according to claim 1, wherein the quarantine state is implemented by the access point responding to a request for a data connection from the mobile device by placing the mobile device into a local subnetwork which contains only predetermined servers and does not contain the end point server.

3. A method according to claim 2, wherein a trust server is provided on the local subnetwork of the quarantine state, the method further comprising downloading data to the mobile device from the trust server through the local subnetwork in the quarantine state.

4. A method according to claim 1, wherein the operation state is implemented by the access point placing the mobile device into a local subnetwork which contains the end point server.

5. A method according to claim 1, wherein the mobile device has an international mobile station equipment identity (IMEI) wherein the method further comprises the step of locking the SIM to the mobile device determined by the IMEI so that the SIM will only operate in the device having the IMEI before the step of sending an authentication message.

6. A method according to claim 1, wherein the step of sending an authentication message from the mobile device to the home location register is carried out on first power up of the device.

7. A method according to claim 1, further comprising repeating steps of:
   using the access point of the mobile network to place the mobile device in the quarantine state;
   sending an authentication message from the mobile device to the home location register;
   using the home location register to trigger, by the authentication message, the registration of the mobile device on the mobile network, and the downloading of the security information from the security server to the device; and
   after a successful download of the security information to the mobile device, using the access point to activate an operation state for the mobile device.

8. A method according to claim 1, wherein the SIM is hard coded with an access point name so that the SIM can only request a packet data connection to that access point name.

9. A method according to claim 1 wherein the security information comprises a security certificate, a key, or both.

10. A method according to claim 1, wherein the downloading of security information takes place using SMS messages.

11. A method according to claim 1 wherein the downloading of security information takes place using USSD messages.

12. A mobile network system, comprising:
   a mobile network comprising an access point connected to a network having an end point server, a security server and a home location register, the security server storing security information used to encrypt and decrypt end-to-end communications with the end point server; and
   a mobile device comprising a processor, a user memory containing a software application programmed to use the security information to encrypt and decrypt the end-to-end communications with the end point server, a security identity module (SIM) and a cellular modem adapted to communicate with the mobile network,
   wherein the mobile network system is arranged:
   to operate the access point of the mobile network to initially place the mobile device in to a quarantine state so that the mobile device cannot access the end point server; and
   to receive an authentication message from the mobile device via the mobile network in the home location register indicated by a SIM in the mobile device,
   using the home location register to trigger, by the authentication message, a registration by the home location register of the mobile device on the mobile network and a download of the security information from the security server, to be used by a software application of the mobile device to encrypt and decrypt the end-to-end communications with the end point server, to the mobile device over the air using the short message service (SMS) and/or unstructured supplementary service data (USSD) messages; and
   after a successful download of the security information to the mobile device, to activate an operation state in the access point thereby exiting the quarantine state, so that the mobile device can access the end point server through the access point.

* * * * *